US009992268B2

United States Patent
Atsatt et al.

(10) Patent No.: US 9,992,268 B2
(45) Date of Patent: Jun. 5, 2018

(54) FRAMEWORK FOR THIN-SERVER WEB APPLICATIONS

(71) Applicant: Oracle International Corporation, Redwood Shores, CA (US)

(72) Inventors: Bryan Atsatt, Half Moon Bay, CA (US); Santiago Martin Pericas-Geertsen, Palm Beach Gardens, FL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 512 days.

(21) Appl. No.: 14/039,514

(22) Filed: Sep. 27, 2013

(65) Prior Publication Data
US 2014/0089395 A1    Mar. 27, 2014

Related U.S. Application Data

(60) Provisional application No. 61/706,281, filed on Sep. 27, 2012.

(51) Int. Cl.
*G06F 9/44* (2018.01)
*H04L 29/08* (2006.01)
(Continued)

(52) U.S. Cl.
CPC .............. *H04L 67/10* (2013.01); *G06F 8/20* (2013.01); *G06F 8/36* (2013.01); *G06F 8/60* (2013.01);
(Continued)

(58) Field of Classification Search
CPC .............. G06F 8/38; G06F 8/61; G06F 8/20
See application file for complete search history.

(56) References Cited

U.S. PATENT DOCUMENTS 7,069,553 B2 * 6/2006 Narayanaswamy ...... G06F 8/61
717/173
9,826,045 B2 * 11/2017 Straub .................. H04L 67/141
(Continued)

FOREIGN PATENT DOCUMENTS

EP    2257026 A1    12/2010

OTHER PUBLICATIONS

Mortimore, C., et al., "OAuth 2.0 Assertion Profile; draft-ietf-oauth-assertions-00.txt," OAuth 2.0 Assertion Profile; Draft-IETF-OAuth-Assertions-00.TXT, Internet Engineering Task Force, IETF; Standardnetworkingdraft, Internet Society (ISOC) 4, Rue Des Falaises CH—1205, Geneva, Switzerland, (Apr. 7, 2011), pp. 1-14. [retrieved on Jul. 4, 2011].
(Continued)

*Primary Examiner* — Wei Zhen
*Assistant Examiner* — Brahim Bourzik
(74) *Attorney, Agent, or Firm* — Kilpatrick Townsend & Stockton LLP

(57) ABSTRACT

In various aspects, a framework is provided for building rich, responsive, and mobile-enabled HTML 5 web applications. In one embodiment, the framework is based on a thin server architecture (TSA) that uses REST, SSE, and WebSocket to communicate with the server side. This framework, sometimes referred to herein as 'Avatar' is a modular, end-to-end web development framework for building enterprise mobile and desktop applications using JavaScript, HTML5 and a thin-server architecture.

23 Claims, 18 Drawing Sheets

(51) Int. Cl.
*H04L 29/06* (2006.01)
*G06F 9/445* (2018.01)
*G06F 17/30* (2006.01)

(52) U.S. Cl.
CPC .......... *G06F 17/3089* (2013.01); *H04L 67/38* (2013.01)

(56) References Cited

U.S. PATENT DOCUMENTS

| | | | | |
|---|---|---|---|---|
| 9,851,967 | B2* | 12/2017 | Geng | G06F 8/71 |
| 2004/0046789 | A1* | 3/2004 | Inanoria | G06F 8/38 |
| | | | | 715/748 |
| 2005/0114630 | A1* | 5/2005 | Brauneis | G06F 8/60 |
| | | | | 712/220 |
| 2006/0206931 | A1 | 9/2006 | Dillaway et al. | |
| 2007/0016696 | A1* | 1/2007 | Jerrard-Dunne | G06F 17/3089 |
| | | | | 709/250 |
| 2007/0288644 | A1* | 12/2007 | Rojas | G06F 8/38 |
| | | | | 709/230 |
| 2009/0013310 | A1* | 1/2009 | Arner | G06F 8/38 |
| | | | | 717/120 |
| 2010/0281107 | A1* | 11/2010 | Fallows | G06F 9/54 |
| | | | | 709/203 |
| 2013/0303288 | A1* | 11/2013 | McCoy | G07F 17/3227 |
| | | | | 463/42 |
| 2014/0082586 | A1* | 3/2014 | Casey | G06F 8/20 |
| | | | | 717/104 |
| 2014/0201615 | A1* | 7/2014 | Rajkumar | G06F 17/30011 |
| | | | | 715/234 |

OTHER PUBLICATIONS

Noureddine M., et al: "A provisioning model towards OAuth 2.0 performance optimization", Cybernetic Intelligent Systems (CIS), 2011 IEEE 10th International Conference on IEEE, (Sep. 1, 2011) pp. 76-80.

Extended European Search Report dated Jul. 14, 2015 in European Application No. 12773179.2, 6 pages.

* cited by examiner

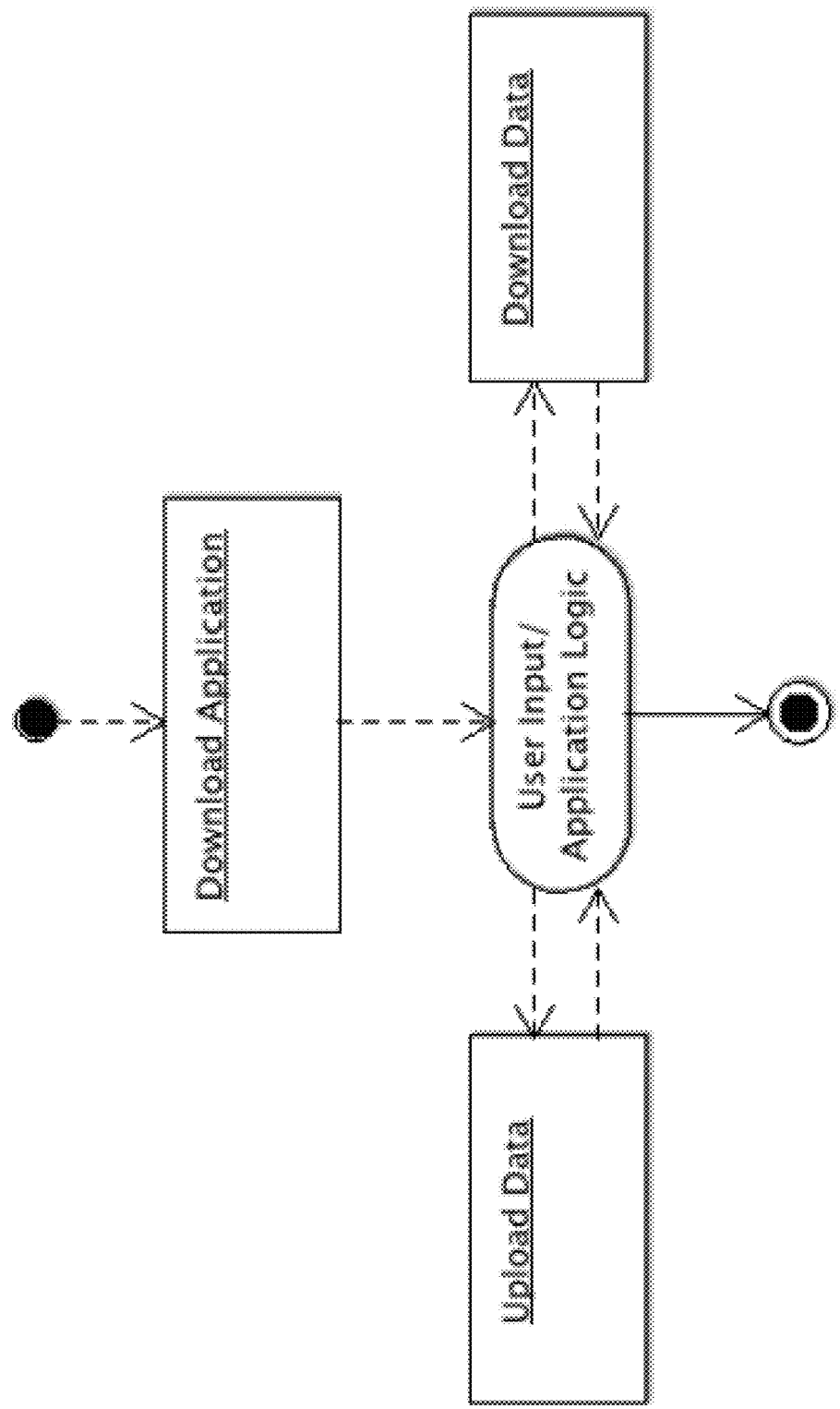

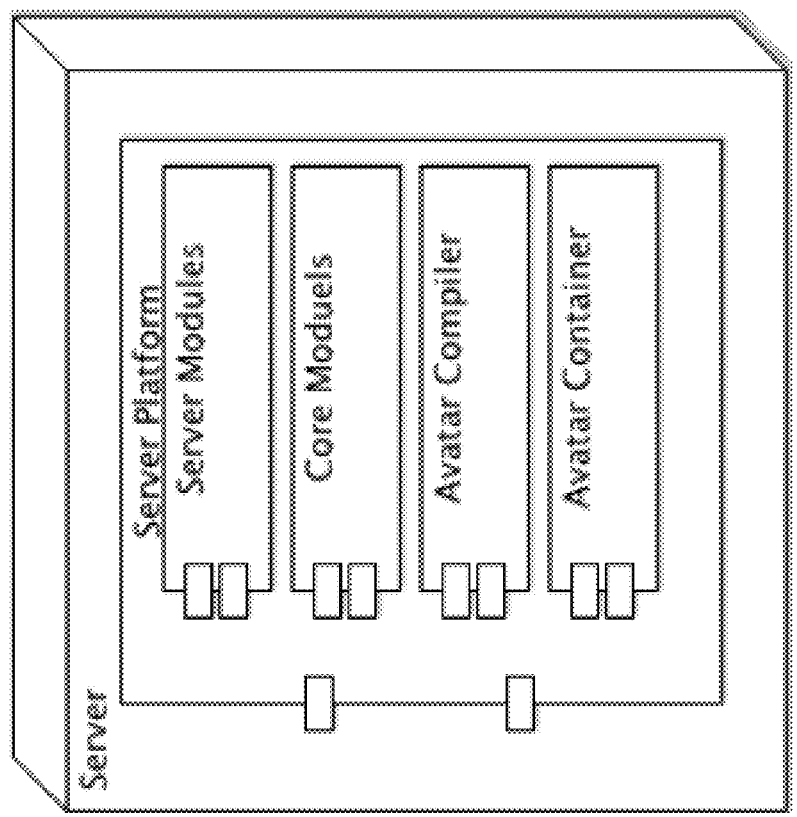
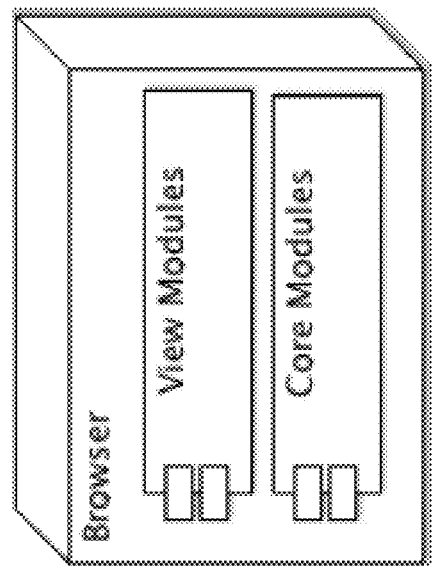
FIG. 7

```xml
<?xml version="1.0" encoding="UTF-8"?>
<viewModule namespace="http://www.example.org/hello" xmlns="http://www.oracle.com/avatar">

<localModel id="NameModel">
        var NameModel = function() {
            this.first = "Planet";
            this.last = "Earth";
            this.clear = function() {
                this.first = this.last = "";
            };
        };
    </localModel>

<model id="name" idref="NameModel"/>
        <form>
            <input label="First Name" value="#{name.first}"/>
            <input label="Last Name" value="#{name.last}"/>
            <output value="Hello #{name.first} #{name.last}"/>
            <button label="Clear" action="#{name.clear()}"/>
        </form>

</viewModule>
```

FIG. 8

```
<?xml version="1.0" encoding="UTF-8"?>
<a:viewModule namespace="http://www.example.org/hello" xmlns:a="http://www.oracle.com/avatar">

<a:localModel id="MathModel">
        var MathModel = function() {
            this.left = 0;
            this.right = 0;
            this.reset = function() {
                this.left = this.right = 0;
            };
        };
    </a:localModel>

<a:page id="addition" title="Hello Math: Addition" main="true">
        <a:model id="add" idref="MathModel"/>
        <table>
            <tr>
                <td width="40%">
                    <img src="./img/addition.gif"/>
                </td>
                <td>
                    <a:form>
                        <a:input label="Operand 1: " value="${add.left}"/>
                        <a:input label="Operand 2: " value="${add.right}"/>
                        <a:output value="The result is ${add.left} + ${add.right} = ${add.left + add.right}"/>
                        <a:button label="Reset" action="${add.reset()}"/>
                    </a:form>
                </td>
            </tr>
        </table>
    </a:page>

<a:page id="subtraction" title="Hello Math: Subtraction">
        <a:model id="sub" idref="MathModel"/>
        <table>
            <tr>
                <td width="40%">
                    <img src="./img/subtraction.gif"/>
                </td>
                <td>
                    <a:form>
                        <a:input label="Operand 1: " value="${sub.left}"/>
                        <a:input label="Operand 2: " value="${sub.right}"/>
                        <a:output value="The result is ${sub.left} - ${sub.right} = ${sub.left - sub.right}"/>
                        <a:button label="Reset" action="${sub.reset()}"/>
                        <a:button label="Prev" href="#addition"/>
                    </a:form>
                </td>
            </tr>
        </table>
    </a:page>

</a:viewModule>
```

FIG. 9

```
<?xml version="1.0" encoding="UTF-8"?>
<a:viewModule namespace="http://www.example.org/rest"
          xmlns:t="http://www.example.org/rest"
          xmlns:a="http://www.oracle.com/avatar">

<a:restModel id="ItemModel">
        var ItemModel = function(collection) {
            this.key = "key1";
            this.value = "";

this.clear = function () {
                this.key = this.value = "";
            };
            this.$onPutDone = function () {
                collection.$get();
            };
            this.$onDeleteDone = function () {
                collection.$get();
            };
        };
    </a:restModel>

<a:restModel id="ItemCollectionModel">
        var ItemCollectionModel = function() {
            this.displayItems = function () {
                var result = "";
                for (var key in this.items) {
                    var value = this.items[key];
                    result +=  key + ":" + value["value"] + "<br>";
                }
                return result;
            }
        };
    </a:restModel>
```

FIG. 10

```
<a:page id="home" title="REST Sample">
    <a:model id="itemCollectionModel" label="ItemCollectionModel" url="data/items"/>
    <a:model id="item" list="ItemModel" dependsOn="itemCollection" url="data/items/#{this.key}"/>

<h2>Item Collection</h2>
    <div style="background:#ededed;padding:3px;border-top:1px solid #ddd;border-bottom:1px solid #ddd">
        <a:button label="GET ALL" action="#{itemCollection.$get()}"/>
    </div>
    <br/>
    <a:output value="#{itemCollection.displayItems()}"/>

<h2>Item</h2>
    <div style="background:#ededed;padding:3px;border-top:1px solid #ddd;border-bottom:1px solid #ddd">
        <a:button label="GET" action="#{item.$get()}"/>
        <a:button label="PUT" action="#{item.$put()}"/>
        <a:button label="DELETE" action="#{item.$delete()}"/>
        <a:button label="Clear" action="#{item.clear()}"/>
    </div>
    <br/>
    <a:form>
        <a:input label="Item Key: " value="#{item.key}"/>
        <a:input label="Item Value: " value="#{item.value}"/>
    </a:form>
</a:page>

</a:viewModule>
```

FIG. 11

```
<?xml version="1.0" encoding="UTF-8"?>
<a:viewModule namespace="http://www.example.org/tickers"
            xmlns:t="http://www.example.org/tickers"
            xmlns:a="http://www.oracle.com/avatar">

<a:pushModel id="TickersModel">
        var TickersModel = function() {
            this.tickers = [ "ACME", "EACM", "MEAC", "CMEA" ];
            this.values = [ 0.0, 0.0, 0.0, 0.0 ];
        };
    </a:pushModel>

<a:page id="home" title="Stock Tickers SSE Sample">
        <a:model id="tk" idref="TickersModel" url="/tickers/push/stocks"/>

<h2>Stock Tickers SSE Sample</h2>
        <hr/><br/>

<table>
            <tr>
                <th>#{tk.tickers[0]}</th>
                <th>#{tk.tickers[1]}</th>
                <th>#{tk.tickers[2]}</th>
                <th>#{tk.tickers[3]}</th>
            </tr>
            <tr>
                <td>#{tk.values[0]}</td>
                <td>#{tk.values[1]}</td>
                <td>#{tk.values[2]}</td>
                <td>#{tk.values[3]}</td>
            </tr>
        </table>
    </a:page>

</a:viewModule>
```

FIG. 12

```
<?xml version="1.0" encoding="UTF-8"?>
<a:serviceModule namespace="http://www.example.org/tickers" xmlns:a="http://www.oracle.com/avatar">

<a:pushService id="StockService" url="/push/stocks">
        var StockService = function() { this.data = {
                tickers: [ "ACME", "EACM", "MEAC", "CMEA" ],
                values: [ 25.0, 50.0, 75.0, 100.0 ]
            };

this.$onOpen = function(context) {
                context.$setTimeout(1000);          // start timer
            };

this.$onTimeout = function(context) {
                this.updateData();
                context.$sendMessage(this.data);
                context.$setTimeout(1000);          // re-start timer
            };

this.updateData = function() {
                // ...
            };
        };
    </a:pushService>

</a:serviceModule>
```

FIG. 13

```
<?xml version="1.0" encoding="UTF-8"?>
<a:viewModule namespace="http://www.example.org/chat"
          xmlns:t="http://www.example.org/chat"
          xmlns:a="http://www.oracle.com/avatar">

<a:socketModel id="ChatModel">
        var ChatModel = function() {
            this.transcript = "";
            this.message = "";
            this.user = "";

this.login = function() {
                this.$send(this.user + " logged in");
            };
            this.send = function() {
                this.$send(this.user+":"+this.message);
                this.message = "";
            };
        };
    </a:socketModel>

<a:model id="ch" type="ChatModel" url="websocket:/chat"/>

<a:page id="login" title="Chat WebSocket Sample" main="true">
        <h2>Login Page</h2>
        <a:form>
            <a:input label="Username: " value="#{ch.user}"/>
            <a:button label="Login" action="#{a:seq(ch.login(), a:pageTo('chat'))}"/>
        </a:form>
    </a:page>

<a:page id="chat" title="Chat WebSocket Sample">
        <h2>Chat Room</h2>
        <a:form>
            <a:textarea label="Transcript" value="#{ch.transcript}"/>
            <br/>
            <a:input label="Message: " value="#{ch.message}"/>
            <a:button label="Send" action="#{ch.send()}"/>
        </a:form>
    </a:page>

</a:viewModule>
```

FIG. 14

```
<?xml version="1.0" encoding="UTF-8"?>
<a:serviceModule namespace="http://www.example.org/chat" xmlns:a="http://www.oracle.com/avatar">

<a:socketService id="ChatService" url="/websockets/chat">
        var ChatService = function() {
            this.data = {
                transcript : ""
            };

this.$onMessage = function (peer, message) {
                this.data.transcript += message;
                this.data.transcript += "\n";
                peer.$getContext().$sendAll(JSON.stringify(this.data));
            };
        };
    </a:socketService>

</a:serviceModule>
```

FIG. 15

FRAMEWORK FOR THIN-SERVER WEB APPLICATIONS

CROSS-REFERENCE TO RELATED APPLICATIONS

This application claims priority to and the benefit of U.S. Provisional Patent Application No. 61/706,281, filed Sep. 27, 2012, and entitled "Avatar," the entire disclosure of which is herein incorporated by reference for all purposes.

BACKGROUND OF THE INVENTION

HTML5 is a markup language for structuring and presenting content for the World Wide Web, and is a core technology of the Internet originally proposed by Opera Software. It is the fifth revision of the HTML standard (created in 1990 and standardized as HTML4 as of 1997) and is still under development. Its core aims have been to improve the language with support for the latest multimedia while keeping it easily readable by humans and consistently understood by computers and devices (web browsers, parsers, etc.). HTML5 is intended to subsume not only HTML 4, but XHTML 1 and DOM Level 2 HTML as well.

Following its immediate predecessors HTML 4.01 and XHTML 1.1, HTML5 is a response to the observation that the HTML and XHTML in common use on the World Wide Web are a mixture of features introduced by various specifications, along with those introduced by software products such as web browsers, those established by common practice, and the many syntax errors in existing web documents. It is also an attempt to define a single markup language that can be written in either HTML or XHTML syntax. It includes detailed processing models to encourage more interoperable implementations; it extends, improves and rationalizes the markup available for documents, and introduces markup and application programming interfaces (APIs) for complex web applications. For the same reasons, HTML5 is also a potential candidate for cross-platform mobile applications. Many features of HTML5 have been built with the consideration of being able to run on low-powered devices such as smartphones and tablets.

HTML5 adds many new syntactic features. These include the new <video>, <audio> and <canvas> elements, as well as the integration of scalable vector graphics (SVG) content (that replaces the uses of generic <object> tags) and MathML for mathematical formulas. These features are designed to make it easy to include and handle multimedia and graphical content on the web without having to resort to proprietary plugins and APIs. Other new elements, such as <section>, <article>, <header> and <nav>, are designed to enrich the semantic content of documents. New attributes have been introduced for the same purpose, while some elements and attributes have been removed. Some elements, such as <a>, <cite> and <menu> have been changed, redefined or standardized. The APIs and document object model (DOM) are no longer afterthoughts, but are fundamental parts of the HTML5 specification. HTML5 also defines in some detail the required processing for invalid documents so that syntax errors will be treated uniformly by all conforming browsers and other user agents.

In designing a client-server application, a decision is to be made as to which parts of the task should be executed on the client, and which on the server. This decision can crucially affect the cost of clients and servers, the robustness and security of the application as a whole, and the flexibility of the design to later modification or porting.

The characteristics of the user interface often force the decision on a designer. For instance, a drawing package could choose to download an initial image from a server and allow all edits to be made locally, returning the revised drawing to the server upon completion. This would require a thick client and might be characterized by a long time to start and stop (while a whole complex drawing was transferred) but quick to edit. Conversely, a thin client could download just the visible parts of the drawing at the beginning and send each change back to the server to update the drawing. This might be characterized by a short start-up time, but a tediously slow editing process.

Accordingly, what is desired is to solve problems relating to the development of feature rich applications for the browser and mobile devise, some of which may be discussed herein. Additionally, what is desired is to reduce drawbacks relating to the development of feature rich applications for the browser and mobile devise, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various aspects, a framework is provided for building rich, responsive, and mobile-enabled HTML 5 web applications. In one aspect, the framework enables developers to create server side services (e.g., JavaScript) using known programming models (such as Node) and a thin server architecture (TSA). The services can be published using WebSockets, REST, and Server Sent Events (SSE). Any client-side framework that can communicate using WebSockets, REST, or SSE can consume these services. In another aspect, the framework enables server-side JavaScript developers to leverage Java EE Services. Additionally, the framework provides for an (optional and independent) client side that can bind HTML5 components to services written in any language.

This framework, sometimes referred to herein as 'Avatar' is a modular, end-to-end web development framework for building enterprise mobile and desktop applications using JavaScript, HTML5 and a thin-server architecture.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 2B is a general flow of an application built using the framework of FIG. 2A in one embodiment.

FIG. 7 illustrates one or more parts of the disclosed framework in one embodiment.

FIG. 8 illustrates one example of an XML specification that defines a view module in one embodiment.

FIG. 9 illustrates one example of an XML specification that demonstrates page navigation in one embodiment.

FIG. 10 illustrates one example of a first portion of an XML specification that demonstrates how to store and retrieve a collection of key/value pairs in one embodiment.

FIG. 11 illustrates one example of a second portion of an XML specification that demonstrates how to store and retrieve a collection of key/value pairs in one embodiment.

FIG. 12 illustrates one example of an XML specification where HTML5 and Server Sent Events (SSE) are used to push data from a server to a client asynchronously in one embodiment.

FIG. 13 illustrates one example of an XML specification for the application's service module in one embodiment.

FIG. 14 illustrates one example of an XML specification for a chat application that uses HTML5 and Web Sockets (WS) to handle asynchronous bidirectional data in one embodiment.

FIG. 15 illustrates one example of an XML specification with code showing how the Chat service module works in one embodiment.

DETAILED DESCRIPTION OF THE INVENTION

Introduction

With the arrival of the HTML5 standard, requirements on web applications have shifted towards a more client focused and interactive environment where mobile devices play an increasingly important role. A framework is discloses implementing technical solutions that satisfy these new requirements. In one aspect, the framework leverages JavaEE and Nucleus as a platform for building modern HTML 5 applications for mobile devices and for the desktop. In some embodiments, the framework provides a technology stack that reduces the cost of building and maintaining HTML 5 enterprise applications for mobile devices and the desktop.

In various aspects, a framework is provided for building rich, responsive, and mobile-enabled HTML 5 web applications. The framework provides a JavaScript services layer zeroed in on supporting REST, WebSockets and Server-Sent Events, and a rich client side framework that assumes very minor JavaScript knowledge. The services side is focused on building data services using JavaScript, while the optional client side is focused on supporting HTML5 and TSA (Thin Server Architecture).

Figure 1:
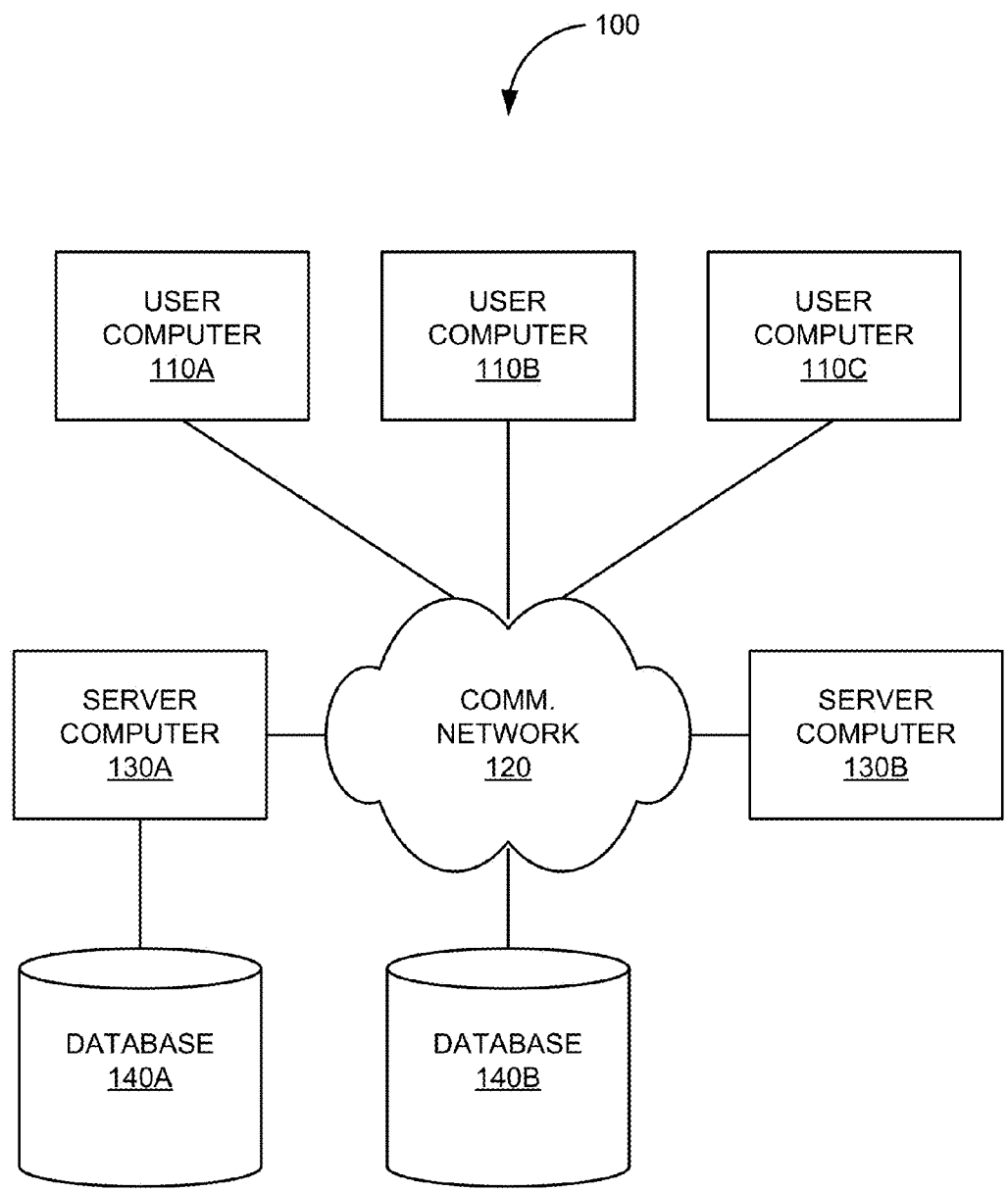
FIG. 1 is a simplified illustration of a system that may incorporate an embodiment of the present invention.

FIG. 1 is a simplified illustration of system 100 that may incorporate an embodiment or be incorporated into an embodiment of any of the innovations, embodiments, and/or examples found within this disclosure. FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 110 (e.g., computers 110A, 110B, and 110C). User computers 110 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 110 can also have any of a variety of applications, including one or more applications configured to perform methods of the invention, as well as one or more office applications, database client and/or server applications, and web browser applications.

Alternatively, user computers 110 can be any other electronic device, such as a thin-client computer, Internet-enabled mobile telephone, and/or personal digital assistant, capable of communicating via a network (e.g., communications network 120 described below) and/or displaying and navigating web pages or other types of electronic documents. Although the exemplary system 100 is shown with three user computers, any number of user computers or devices can be supported.

Certain embodiments of the invention operate in a networked environment, which can include communications network 120. Communications network 120 can be any type of network familiar to those skilled in the art that can support data communications using any of a variety of commercially-available protocols, including without limitation TCP/IP, SNA, IPX, AppleTalk, and the like. Merely by way of example, communications network 120 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 130 (e.g., computers 130A and 130B). Each of server computers 130 may be configured with an operating system including without limitation any of those discussed above, as well as any commercially-available server operating systems. Each of server computers 130 may also be running one or more applications, which can be configured to provide services to one or more clients (e.g., user computers 110) and/or other servers (e.g., server computers 130).

Merely by way of example, one of server computers 130 may be a web server, which can be used, merely by way of example, to process requests for web pages or other electronic documents from user computers 110. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 110 to perform methods of the invention.

Server computers 130, in some embodiments, might include one or more file and or/application servers, which can include one or more applications accessible by a client running on one or more of user computers 110 and/or other server computers 130. Merely by way of example, one or more of server computers 130 can be one or more general purpose computers capable of executing programs or scripts in response to user computers 110 and/or other server computers 130, including without limitation web applications (which might, in some cases, be configured to perform methods of the invention).

Merely by way of example, a web application can be implemented as one or more scripts or programs written in any programming language, such as Java, C, or C++, and/or any scripting language, such as Perl, Python, or TCL, as well as combinations of any programming/scripting languages. The application server(s) can also include database servers, including without limitation those commercially available from Oracle, Microsoft, IBM and the like, which can process requests from database clients running on one of user computers 110 and/or another of server computers 130.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to one of user computers 110 via a web server (as described above, for example). Similarly, a web server might receive web page requests and/or input data from one of user computers 110 and/or forward the web page requests and/or input data to an application server.

In accordance with further embodiments, one or more of server computers 130 can function as a file server and/or can include one or more of the files necessary to implement methods of the invention incorporated by an application running on one of user computers 110 and/or another of server computers 130. Alternatively, as those skilled in the art will appreciate, a file server can include all necessary files, allowing such an application to be invoked remotely by one or more of user computers 110 and/or server computers 130. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 140 (e.g., databases 140A and 140B). The location of the database(s) 140 is discretionary: merely by way of example, database 140A might reside on a storage medium local to (and/or resident in) server computer 130A (and/or one or more of user computers 110). Alternatively, database 140B can be remote from any or all of user computers 110 and server computers 130, so long as it can be in communication (e.g., via communications network 120) with one or more of these. In a particular set of embodiments, databases 140 can reside in a storage-area network ("SAN") familiar to those skilled in the art. (Likewise, any necessary files for performing the functions attributed to user computers 110 and server computers 130 can be stored locally on the respective computer and/or remotely, as appropriate). In one set of embodiments, one or more of databases 140 can be a relational database that is adapted to store, update, and retrieve data in response to SQL-formatted commands. Databases 140 might be controlled and/or maintained by a database server, as described above, for example.

Thin-Server Architecture

Figure 2A:
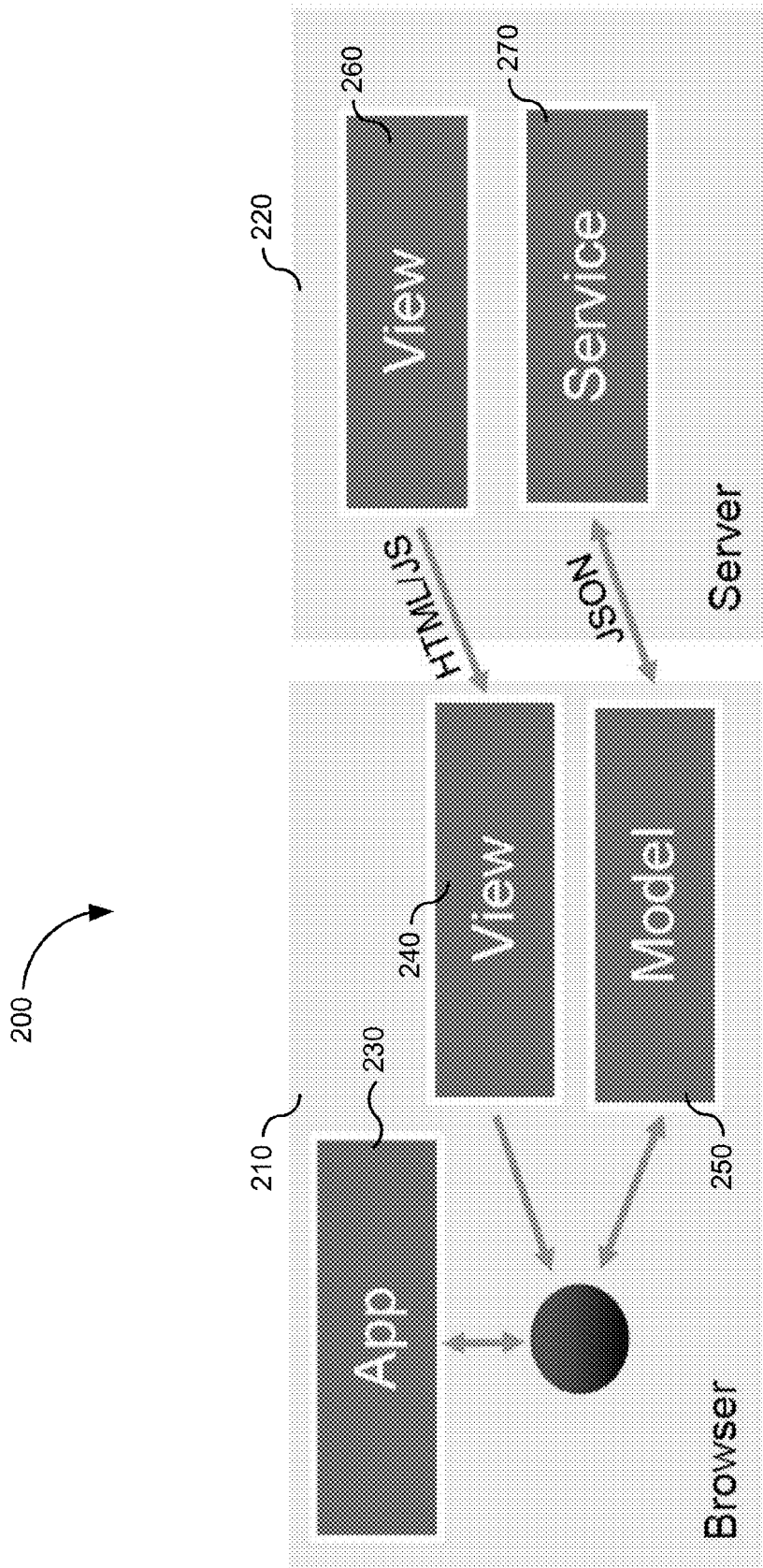
FIG. 2A is a block diagram of a framework for thin-server applications in one embodiment.

FIG. 2A is a block diagram of framework 200 for thin-server applications in one embodiment according to the present invention. In general, framework 200 provides applications that are comprised of either client side "views", server side "services" or, for convenience, both. There is no inherent coupling between views and services, enabling views to communicate with existing services and for services to be consumed by any type of client. Framework 200 can deploy an application as an "archive" on the server and be compiled to generate JavaScript tailored to the application. In one aspect, generated JavaScript for views handles data-binding with the DOM/UI as well as data-management to remote services and local storage.

Accordingly, framework 200 provides for building rich, responsive, and mobile-enabled HTML 5 web applications. In one embodiment, framework 200 includes a thin server architecture (TSA) that uses various mechanisms (such as REST, SSE, and WebSocket) implemented by browser 210 to communicate with server 220. Framework 220 provides a modular, end-to-end web development framework for building enterprise mobile and desktop applications using JavaScript, HTML5 and a thin-server architecture.

In this example, when application 230 is first accessed, presentation (view 240) and client side application logic (model 250) is downloaded. Presentation and client side application logic may include static HTML/JavaScript content that is sufficient to render one or more views and navigate through application 230. In general, view modules like view 240 are specific to browsers and provide the UI components for that browser from view 260 on server 220. Service modules that run on server 220 (such as service 270) provide supporting services to view components. In various embodiments, framework 200 provides view and service modules in a single application, giving an end-to-end framework that contains client and server code in a single deployable archive.

FIG. 2B is a general flow of an application built using framework 200 of FIG. 2A in one embodiment. In box 210, when an application is first accessed (for example by a user's browser), presentation and client side application logic is downloaded. The presentation and client side application logic may include static HTML/JavaScript content that is sufficient to render one or more views and navigate through the application.

In box 220, user input is processed and application logic performed. In some embodiments, use of REST, SSE, and WebSocket as the preferred communication interface between a server and the client for uploading data in box 230 and downloading data in box 240. Framework 200 provides a clear separation of client and server logic. Although framework 200 can be used for building only the client part or the server part of an application, in various embodiments, framework 200 provides an end-to-end solution that encapsulates all aspects of applications, from presentation layer to back-end data services. As such, framework 200 can provide more extensive compile time validation of code.

Figure 3:
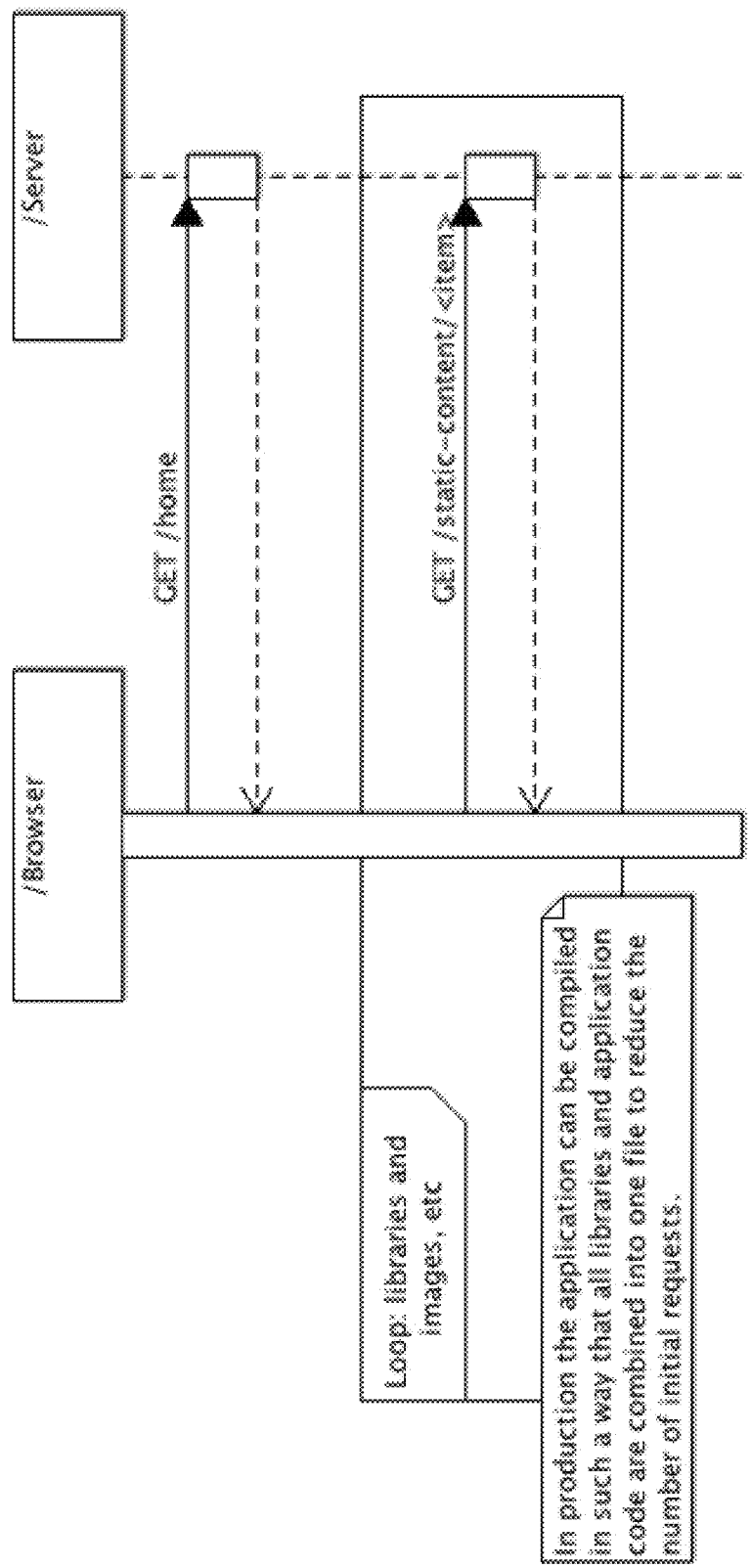
FIG. 3 illustrates how data is retrieved from one or more REST interfaces on a server.

FIG. 3 illustrates how data is retrieved from one or more REST interfaces on a server. For example, when specific data is needed, the data is retrieved from one or more REST interfaces on the server. Similarly, when data needs to be sent to the server, the data can also be sent through REST interfaces. Asynchronous data from the server and bidirectional real-time data can be, for example, communicated over Server Sent Events (SSE) or WebSocket. In some embodiments, use of REST, SSE, and WebSocket as the preferred communication interface between server and client creates a clear separation of client and server logic.

In general, framework 200 runs on top of an application server, such as GlassFish. In this example, framework 200 has access to all Java EE features and applications can take advantage of them. In another aspect, framework 200 enables the full power of Java EE and its APIs to be used directly by developing Java services, or indirectly by using JavaScript APIs. Framework 200 also supports generic JavaScript-to-Java interface in scripting containers, such as Nashorn (which enables invocation of Java methods directly from JavaScript)—and taking advantage of rich set of Java libraries.

In some embodiments, framework 200 services supports the notion of a data provider. From a practical perspective, a data provider is similar (i.e., has a similar interface) to an associative array in which values can be stored and retrieved using keys. However, providers can be implemented on different forms of data sources such as text files, distributed caches, databases, etc. Providers offer developers a tighter integration with Java SE and EE features without the need to use the JavaScript-to-Java interface.

Framework 200 also includes a JavaScript API to interface with the Java Messaging Service (JMS). JMS in conjunction with WebSocket connections expand the possibilities to interact with client applications, and existing messaging systems can benefit from this new technology. Generally speaking, framework 200 allows the JavaScript APIs to be more declarative and provide fewer configuration options than those in Java EE.

Programming Model

In various embodiments, framework 200 provides a programming model that is based on a declarative XML language. The programming model may be used to build a variety of layers, for example, both client side presentations and server side services. In one embodiment, a presentation layer of an application is represented as a tree of view components and data models expressed as XML, elements. JavaScript or other scripted, interpreted, or compiled code can be embedded or included for implementing client side application logic. In some embodiments, Expression Language (EL) is used to tie together view components with models and business logic. Expression Language (EL) is a scripting language which allows access to Java components (JavaBeans) through JavaServer Pages (JSP).

Figure 4:
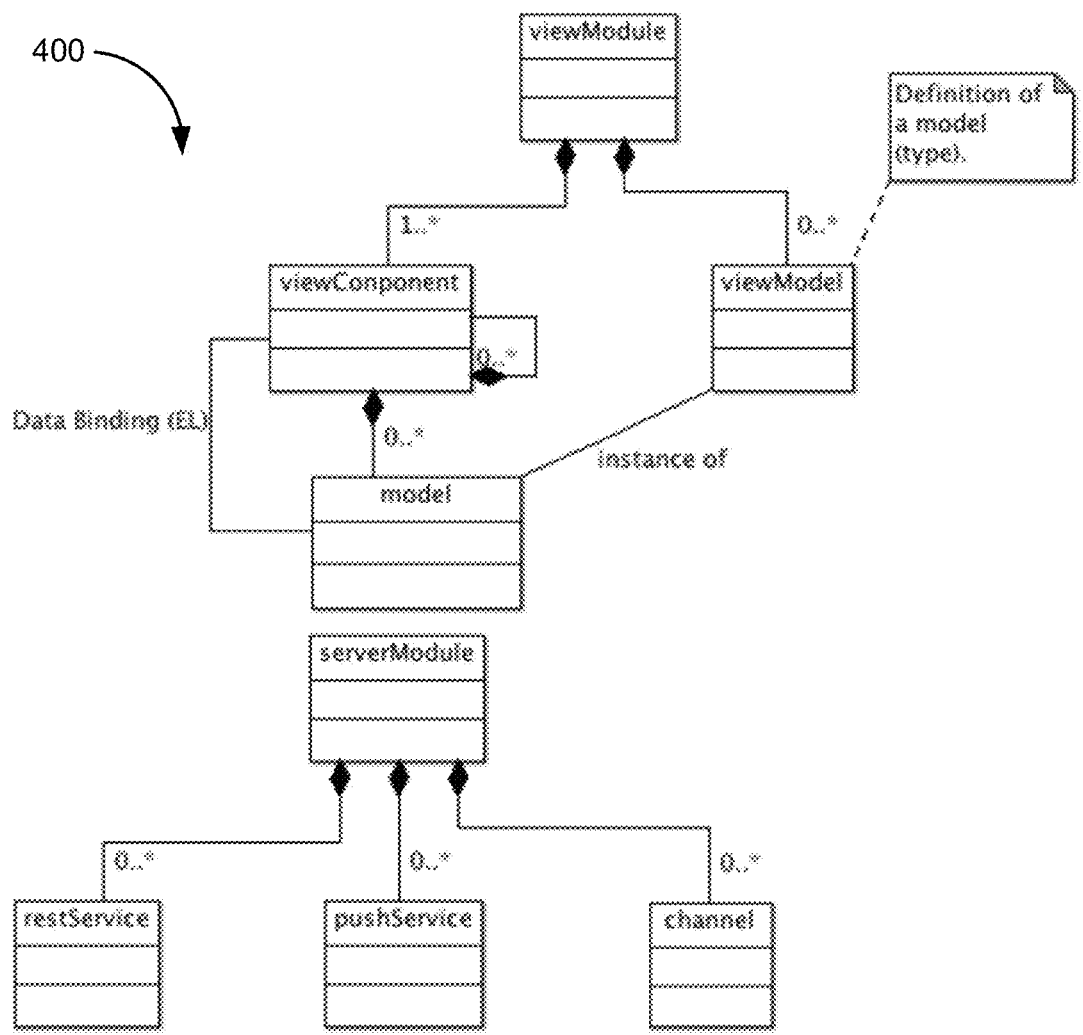
FIG. 4 illustrates an example of the programming model in one embodiment.

FIG. 4 illustrates an example of programming model 400 in one embodiment.

In various embodiments, the same declarative XML language used to specify client side presentations can be used for building one or more server sides of an application. The declarative XML language can be used to define REST, SSE, and WebSocket interfaces tied together with server side application logic and data storage. In one aspect, JavaScript or other scripted, interpreted, or compiled code will also be used to implement server side logic embedded in the xml descriptor, for example, in the same way as for client code. Accordingly, web developers are provided an environment for building complete applications end-to-end in a familiar language such as JavaScript. The glue functionality is left for framework 200 to take care of.

Figure 5:
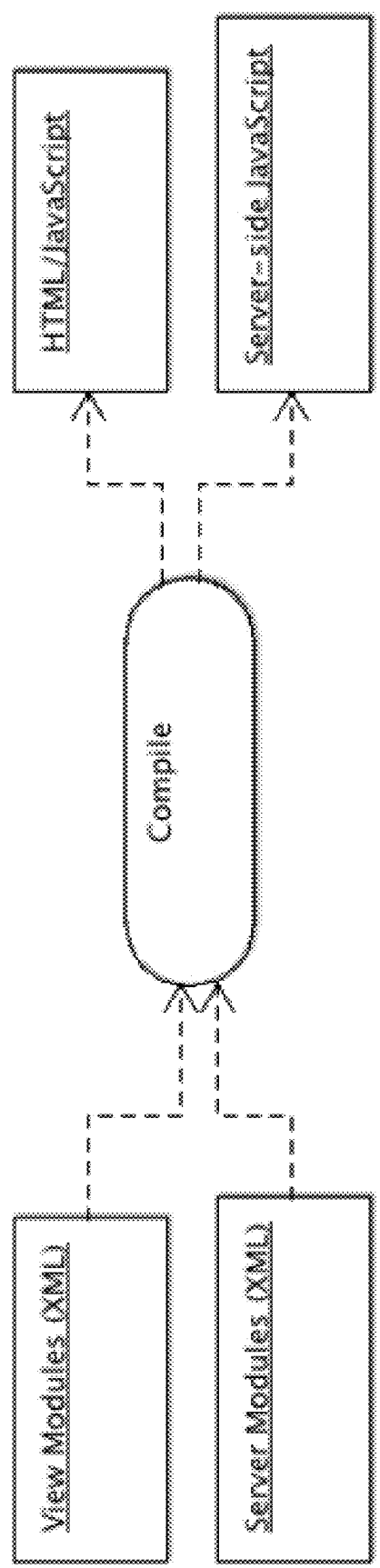
FIG. 5 illustrates how static html/JavaScript content is generated for the client and the server based on the client side part of the application code and the server side part of the application code in one embodiment.

Although no HTML markup needs to be written, an application can be embedded in HTML pages, and HTML can also be mixed in with the declarative XML code for an application. FIG. 5 illustrates how static html/JavaScript content is generated for the client and the server based on the client side part of the application code and the server side part of the application code in one embodiment. During compile/deploy time, framework 200 generates static html/JavaScript content based on the client side part of the application code. The static content preferably will not be changed until the application is redeployed/recompiled. Therefore, the static content is suited to be cached by intermediate servers. The server side of the application code is preferably compiled into Java/JavaScript code that executes on a server upon request for any of the REST, SSE, or WebSocket services defined in a framework specification.

In some embodiments, framework 200 leverages JavaEE as a data service layer using APIs such as JAX-RS, JPA, and the WebSocket API. In further embodiments, the framework allows the use of other non-JavaEE backends and is specifically not dependent on a servlet container.

Additionally, like most modern web frameworks, framework 200 provides automatic data binding between view models and view component. A two-way binding ensures that a model value is updated as soon as a view component to which it is bound is changed, and vice versa. In some aspects, a model is bound to a view component, for example, using EL expressions.

Tooling, such as IDE plugins, can be configured to provide for a productive and attractive development experience. These tools can include syntax highlighting and completion of the framework XML language, graphical tools for building presentation layers, and graphical tools for defining server side services (REST, SSE, WebSocket). In some embodiments, the framework is component based and is configured to contain a large set of widgets covering a majority of the features available in HTML 5. One option for widgets is to support/wrap 3rd party widget sets, such as Dojo or jQuery UI. An API is further provided that allows users to create their own widgets and plug them in to the framework.

Application Composition

Figure 6:
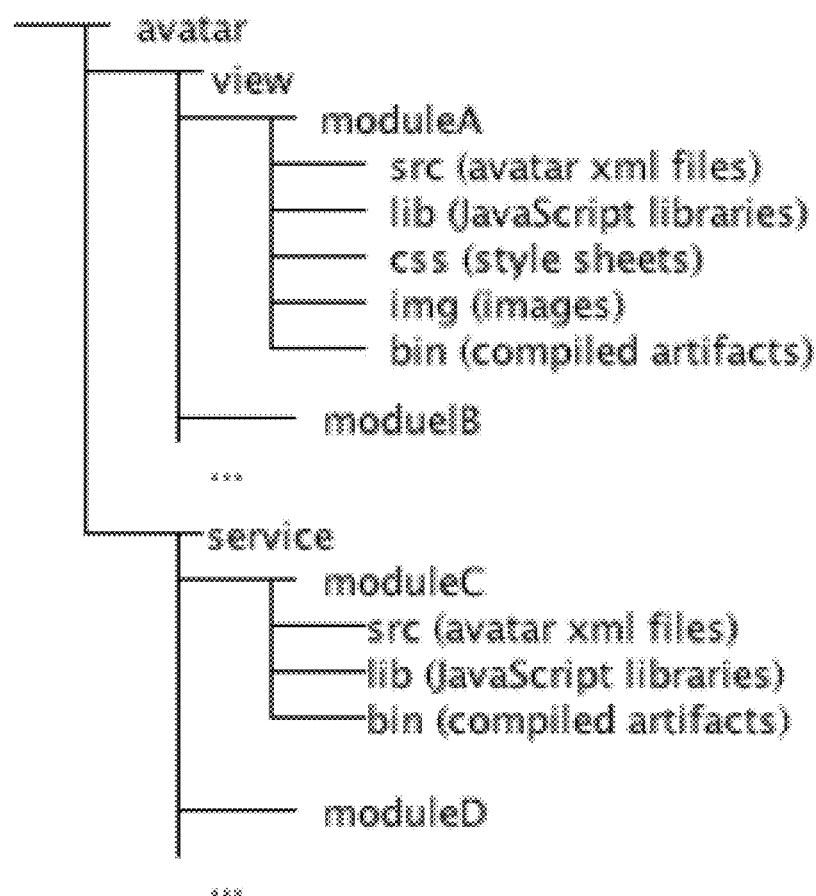
FIG. 6 illustrations an example of an application hierarchy in one embodiment.

FIG. 6 illustrations an example of an application hierarchy in one embodiment. In general, an application consists of one or more modules. The modules may be collected under a predefined root directory. The root directory may be configured to live at the root of either a deployment archive (e.g. a .war or .zip file) or a deployment directory in some embodiments.

In this example, a module is a directory structure that contains source files targeted at either the client ('view modules') or the server ('service modules'). View modules may contain XML, JavaScript (or other client side logic), Cascading Style Sheets (CSS), and image source files. These file describe and define browser artifacts. The files are compiled in a final form of browser artifacts from these sources. Service modules may contain XML and JavaScript (or other service side logic) files. These files define server executable. The framework wires requests and threads to services configured in the XML specification. In various embodiments, a module may contain pre-compiled artifacts for a client or server.

Modules

A module has a name and forms a namespace. In one embodiment, a module name is a relative directory path under a client (e.g., view) or server (e.g., service) root directory. For example, a view module 'foo' is contained in 'avatar/view/foo/'. In another example, a service module 'x.y' is contained in 'avatar/service/x/y/'. In some embodiments, a module 'x.y' is not related to a module 'x' because namespaces are configured to be flat and not nested.

In one embodiment, a module directory has the following sub-directory structure:
  src/ contains source(e.g. .xml) files
  lib/ contains .js files [optional].
  css/ contains .css files [optional].
  img/ contains image files [optional].
  bin/ contains compiled artifacts [optional].

A module source file may declare dependent modules (e.g. as imported namespaces). Files in css and lib directories can be automatically included as browser resources, as are those in dependent modules, transitively.

A module may further be distributed using any convenient archive format (zip/tar, etc). A framework root directory for an application could live under WEB-INF in a .war. However, there is the ability to deploy applications into other container types. Assuming the target environment is an EE container, the root directory can live alongside any other container supported web artifacts in a .war file.

Framework Structure

FIG. 7 illustrates one or more parts of the disclosed framework in one embodiment. In this example, the framework includes a compiler, a container, one or more core modules, one or more view modules, and one or more server modules.

In one embodiment, the framework compiler consists of Java code to process XML source files. The compiler does not know about container environments (e.g. EE/Node.js/JUnit) but runs, in this example, as a standalone Java process for pre-compilation or inside a server container for runtime compilation. Given two lists of Modules, one for views and one for services, the framework compiler produces HTML and JavaScript code. A module object is responsible for providing read access to all contained source files and, optionally, for providing storage for generated artifacts. A module is stateful (e.g. knows if it is mutable, knows last modified time if so, maybe keeps indices, etc.). If a module is inside of a zip/jar, it is immutable and presumed complete (i.e. has been processed and contains all generated artifacts). For performance reasons, the compiler can optimize and compress produced JavaScript or other application logic code, if desired.

The framework container provides integration with underlying platforms, such as EE (servlet), Node.js, JUnit, etc. The framework container is responsible for locating system and app modules and producing view and service module lists, instantiating the system, and passing lists of modules.

The one or more framework core modules include a set of core view and service modules. These modules contain node definitions and JavaScript code or other application logic serving as a base for widgets and services. Applications may bundle modules with the same names as those in the system and the bundled ones must take precedence.

The one or more view modules are the collection of widgets that the framework provides. These widgets will be run in a browser.

The one or more server modules contain the nodes for building server side services (REST, SSE, WebSocket).

Example Application

The following tutorial provides code examples and illustrates sample applications that demonstrate several key concepts and core functionality of the framework. In various embodiments, modules may be of two types. View modules, which are specific to browsers or mobile devices and provide user interface components. These are retrieved by the browser or mobile device. Service modules, which run on a server, provide supporting services to corresponding view modules or components. By having view and service modules in a single application, the framework provides an end-to-end solution that contains the client and server code in a single deployable archive.

FIG. 8 illustrates one example of an XML specification that defines a view module in one embodiment. In this example, a first element defines a new 'viewModule.' The element contains a special attribute called namespace. The namespace attribute is similar to a target namespace in XML schema. Every ID defined in the module belongs to this namespace.

Within the view module, a model is defined for an application. In this example, the model is called localModel. The model has two properties, 'first' and 'last,' each with an initial value, and one function, 'clear.' In the framework code, the model declaration, <localModel id="NameModel">, behaves somewhat similar to a constructor of a Java class. Every time it's called, it creates a new instance of the model. The model instantiation is seen in the following code: <model id="name" idref="NameModel"/>. This code creates an instance of the model with the name, "name", and a reference to the local model that was previously defined, called "NameModel". Multiple instances of a model may be created.

In this example, the local model exists on the client side, e.g., in the browser or application of the mobile device, and needs no connection to a server. Application data, thus, is easily accessible and highly responsive to change in this context.

In addition to the local model, if data needs to be persisted and communicated to or from the server, the framework provides for other models. Some examples are rest, push, and socket.

The application presents a simple form with two input components, one output component, and a button. A change in the data in either input field further results in the output field automatically updated with the new data. This is due to data binding by the framework. Data binding ensures that the UI and the data model are synchronized. The data binding direction (one-way or two-way) depends on the UI component. An input UI component establishes two-way data binding which means that an edit in an input field in the UI causes the data model to be correspondingly updated. The converse is also true, whenever the data model is updated, the UI will correspondingly be updated. In another example, an output component establishes a one-way data binding, from the data model to the UI.

Referring again to FIG. 8, the framework further provides a page definition. An application includes at least one page. In this sample application, the page is called 'home.' A module, however, can contain any number of pages defined in a single XML file. In various embodiments, navigating from one page to another is facilitated without going to a server to get the next application page. For example, each page may be identified by an ID. An action is defined, such as when an event occurs, for example, when a button is clicked, to go the next page ID. Navigation occurs locally, as part of the application itself, in the browser or mobile device. One exception to this rule is when the page is in a different module. In that case, the module might need to be first downloaded from the server.

Another concept shown in the code example of FIG. 8 is a UI node. Everything in a page resides in its own UI node. For example, in this page, there is a page node, a form node, an input node, an output node, and a button node. For each XML page, a UI tree structure is dynamically generated with the page node and all its children nodes corresponding to all the nodes that are defined in the UI.

FIG. 9 illustrates one example of an XML specification that demonstrates page navigation in one embodiment. In this example, an application is defined to present a simple form that can be updated. The input and output fields behave as they did in the example of FIG. 8 and follow the same data binding models. The Next and Previous buttons execute page navigation code.

Navigation is very quick from one page to the other because navigation is accomplished without any network communication. As discussed above, any UI components are downloaded to the browser or client device in the initial request. In some embodiments, the browser is actually hiding one page and showing the other. The next and previous actions are implemented in this example by passing the ID of the page to which to navigate.

In some embodiments, a URL hash scheme is used for navigation. For example, #/<pane-id>?params may be used where params is of the form: name1=value1&name2=value2& . . . The # may be the only mandatory option as used in this example.

FIG. 10 illustrates one example of a first portion of an XML specification that demonstrates how to store and retrieve a collection of key/value pairs in one embodiment. In this example, any REST operation can be performed on the keys. A 'PUT' operation is used to add key/value pairs in a collection. A 'GET' operation is used to retrieve a key's value. A 'DELETE' operation is used to delete a key/value pair from the collection. When there is an update to the keys and values, the collection gets updated and likewise, because of data binding, data is synchronized.

This example in includes use both a view and service module (not shown). For example, the model declaration indicates that this is a restModel. The rest model is different from a local model. The rest model is preferably connected to a REST service on the server side. In addition, the rest model has a different object prototype. In JavaScript, a prototype provides a default behavior for an object, somewhat like a base class in Java. In various embodiments the framework allows you to use an object's default behavior or overwrite it with application code. For example, the dollar sign ($) is used to denote methods with default behaviors which are defined in the framework.

In this application, $get, $put, and $delete methods retain their default behaviors. The $onPutDone and $onDeleteDone methods have been overridden. The reason for doing this is that, by default, REST communications are asynchronous. In some cases, certain events are intercepted to update the data model, for example, when a value has already been put or deleted. In this application, the $onPutDone and $onDeleteDone methods have been overridden to intercept the put and delete functions and update the collection model whenever they are called.

In FIG. 10, two rest models are defined ItemModel and ItemCollectionModel. FIG. 11 illustrates one example of a second portion of an XML specification that demonstrates how to store and retrieve a collection of key/value pairs in one embodiment. In this portion of the code, two model instances are defined, itemCollection and item. In the code which defines the item instance, there's a dependency via a dependsOn attribute.

```
<a:model id="item" idref="ItemModel" dependsOn="itemCollection"
url="data/items/#{this.key}"/>
```

This indicates that the item instance depends on the itemCollection instance. Each instance of the item model holds an individual key/value pair, whereas an item collection instance holds all the key/value pairs. An update to the item model (a single key/value pair) will correspondingly update the data in the collection of key/value pairs.

The item model functions act on the collection, as seen in this code:

```
<a:restModel id="ItemModel">
    var ItemModel = function(collection)
```

Also seen in this code:

```
this.$onPutDone = function ( ) {
    collection.$get( );
};
this.$onDeleteDone = function ( ) {
    collection.$get( );
};
```

These methods force a refresh of the collection object. The collection object provides the updated data to the UI. In the rest model instance, a URL is defined with which the application interacts and persists information on the server. Each instance definition contains a URL. one for each item and one for the collection.

```
<a:model id="itemCollection" idref="ItemCollectionModel"
url="data/items/"/>
<a:model id="item" idref="ItemModel" dependsOn="itemCollection"
url="data/items/#{this.key}"/>
```

The URL is used by the framework to identify each resource in the system, each item resource and the collection resource. Notice that the item resource appends the key value to the end of the URL so the URL changes as the model changes.

FIG. 12 illustrates one example of an XML specification where HTML5 and Server Sent Events (SSE) are used to push data from a server to a client asynchronously in one embodiment. In this example, the server is notified of the data change (for example, incoming stock quotes) and then pushes the data to the browser.

FIG. 12 illustrates a purely declarative sample application. The data binding cause the UI to be updated when the model is refreshed from the server. In this example, code from the application's view module is provided with a 'pushModel' and a 'tk' instance defined. The push model demonstrates a one-way data communication model, from the server to the client. The server sends data to the client which updates the model. When the model gets updated, it updates the UI nodes. There is no procedural code required to accomplish this behavior. Data is obtained from the server without ever having to request it. HTML tags can be used anywhere in a page. In the code example, a mixture of components from the one namespace (prefixed with a:) and HTML tags are provided.

FIG. 13 illustrates one example of an XML specification for the application's service module in one embodiment. After the service module declaration, a 'pushService' definition is provided with a URL where the service is listening for data. The push service has two methods, $onOpen and $onTimeOut. When there is a new connection, $on Open is called and sets a timeout value (1000 milliseconds). When the timeout expires $onTimeOut is called which updates the data, sends the data to the client and resets the timer. In this manner, the data is updated and periodically sent to the client (every second).

FIG. 14 illustrates one example of an XML specification for a chat application that uses HTML5 and Web Sockets (WS) to handle asynchronous bidirectional data in one embodiment. For example, messages or obtained or sent whenever they become available. The application is defined with a page to log in by typing a name and clicking Login. In the Chat Room, text is typed in the Message field and sent by clicking 'Send.' In the Transcript output text box, a user can see that they are logged in and view their messages alongside their login name.

In this example, a viewModule and a socketModel are defined. The model has two methods, one of which sends the login data and the other of which sends the chat message. The model instance definition here <a:model id="ch" idref="ChatModel" url="/websockets/chat"/> occurs outside of a page definition. This allows the same instance to be used by both pages. The main page, the Login Page (main="true"), contains a button action which illustrates another method used to navigate to a different page.
<a:button label="Login" action="#{a:seq(ch.login( ), a:pageTo('chat'))}"/>

This action defines a sequence, first calling the login method, and when that returns, it calls pageTo, an predefined framework function, which finds the next page ID.

FIG. 15 illustrates one example of an XML specification with code showing how the Chat service module works in one embodiment. The socket model demonstrates a two-way data communication model, from the client to the server and from the server to the client. When a message is typed and the Send button clicked, the service is invoked. The $onMessage method, appends the message to the transcript and $sendAll broadcasts the entire transcript to all the participants in the chat room. Each participant receives the transcript, thus updating the chat model and subsequently updating the UI as a result of data binding.

Figure 16:
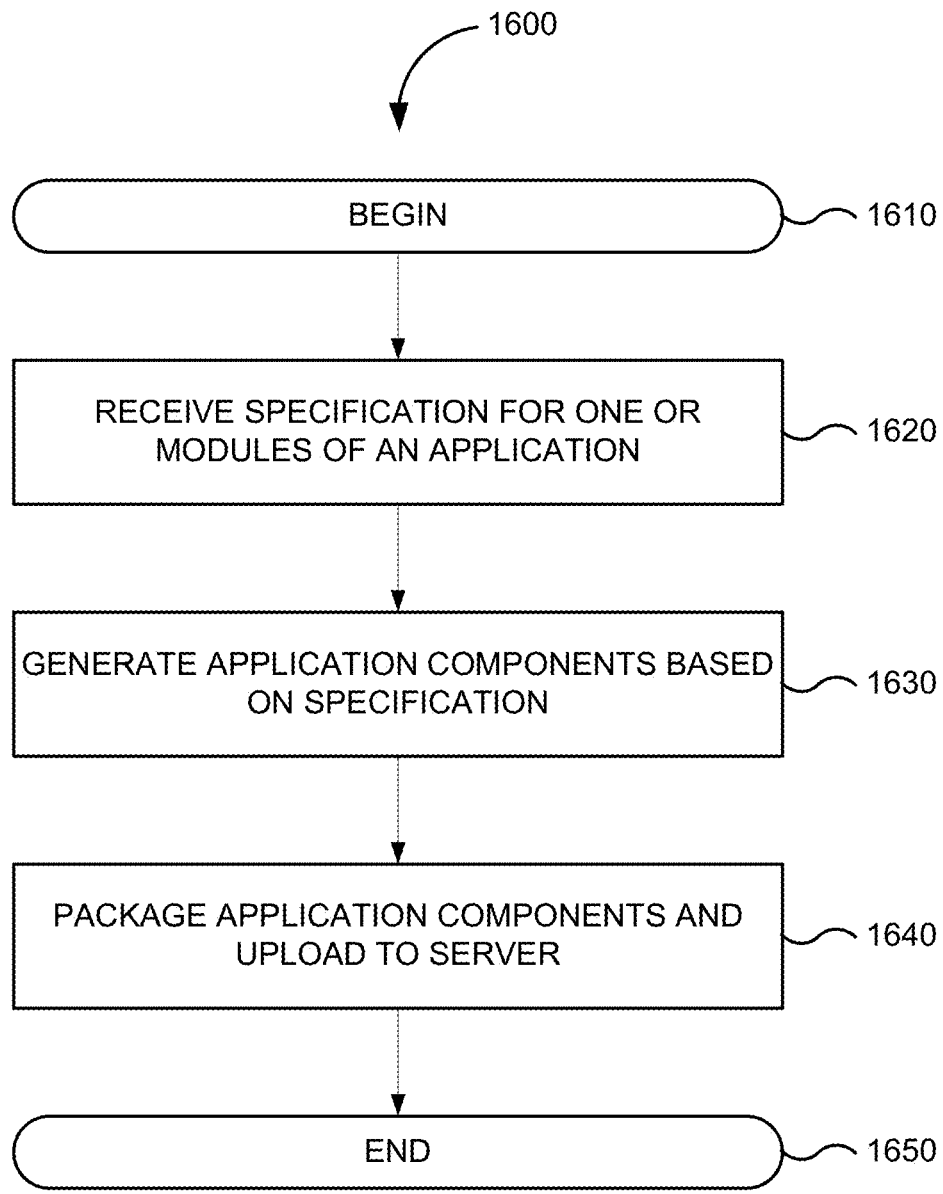
FIG. 16 is a flowchart of a method for packaging an application created declaratively in one embodiment according to the present invention

FIG. 16 is a flowchart of method 1600 for packaging an application created declaratively in one embodiment according to the present invention. Implementations of or processing in method 1600 depicted in FIG. 16 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1600 depicted in FIG. 16 begins in step 1610.

In step 1620, a specification for one or more modules of an application received. In various embodiments, modules may be of two types. View modules, which are specific to browsers or mobile devices and provide user interface components. These are retrieved by the browser or mobile device. Service modules, which run on a server, provide supporting services to corresponding view modules or components. By having view and service modules in a single application, the framework provides an end-to-end solution that contains the client and server code in a single deployable archive.

In step 1630, application components are generated based on specification. In step 1640, the application is packaged and uploaded to a server. FIG. 16 ends in step 1650.

In various embodiments, the framework can support the use of off-the-shelf widgets that including forms, trees, tables, menus, and various pane containers. In further embodiments, the framework supports a pluggable model for widget libraries. Some examples of widget libraries include Dijit widgets from Dojo, jQuery Mobile widgets, and the like. A widget library used by an application may be controlled by a property in a file that is part of the deployable artifact.

In further embodiments, the framework provides for HTML5 local storage. Storage can be enabled for a model so that it is preserved across application restarts.

In one aspect, the framework complier is adapted to be controlled by a debugging mode. In a debugging mode, an application specification is deployed to a server. A developer may live-edit the application specification or files needed to run the application that are referenced by the application specification. The developer then may test changes made to the application in the debugging mode. In another aspect, the developer may disable the debugging mode, and the framework may compile and assemble an application archive in an optimized manner for production.

In some embodiments, files needed for execution of an application by a client or a server are optimized by customizing one or more libraries used by the application. The framework may automatically adapt libraries or other 3-party files for the application. In one embodiment, the framework may include only a portion of one or more libraries used by the application in the deployed application to reduce space and data required to be communicated to a client. A library may be customized to attributes of a browser or target device.

In further embodiments, the framework automatically handles localization. In one example, an initial resource bundle configured to facilitate localization of the application can be generated by the framework based on the application specification. Any strings or other localizable resources may be extracted and assigned a resource key in one or more properties files. Variations of these initial property files that are adapted for alternative locales can be automatically identified and included for application deployment during production.

In some embodiments, an application specification is an XML file including elements having HTML data elements or JavaScript data elements. The framework can provide early error detection of the HTML data elements or the JavaScript data elements prior to deployment on a client or server.

In various embodiments, a portable representation of application logic is generated. For example, JavaScript code may be extracted from the application specification as a portable representation of application logic. Java byte code can be compiled from the portable representation of application logic for execution on a client or server. Application logic may otherwise be adapted for a client scripting engine or for an virtual machine of a server or native execution on the server.

In further embodiments, the framework can automatically deploy one or more libraries needed by the application to a server for use by a client based on the application specification. The application specification may include one or more declarations for libraries, such as UI widgets. The framework may make available the libraries and/or, as discussed above, optimize the library for use with the application.

In one aspect, the framework provides for the processing and expansion of templates. Templates may be reused in the application specification to set variable attributes of application views, models, and services.

In at least one embodiment, a portion of the application specification can reconfigure or add additional functionality to a complier of the application. One or more plugins can be developed that extend or alter the framework complier. The plugins can be referenced in the application specification such that a developer can declaratively extend the architecture of the framework compiler.

CONCLUSION

Figure 17:
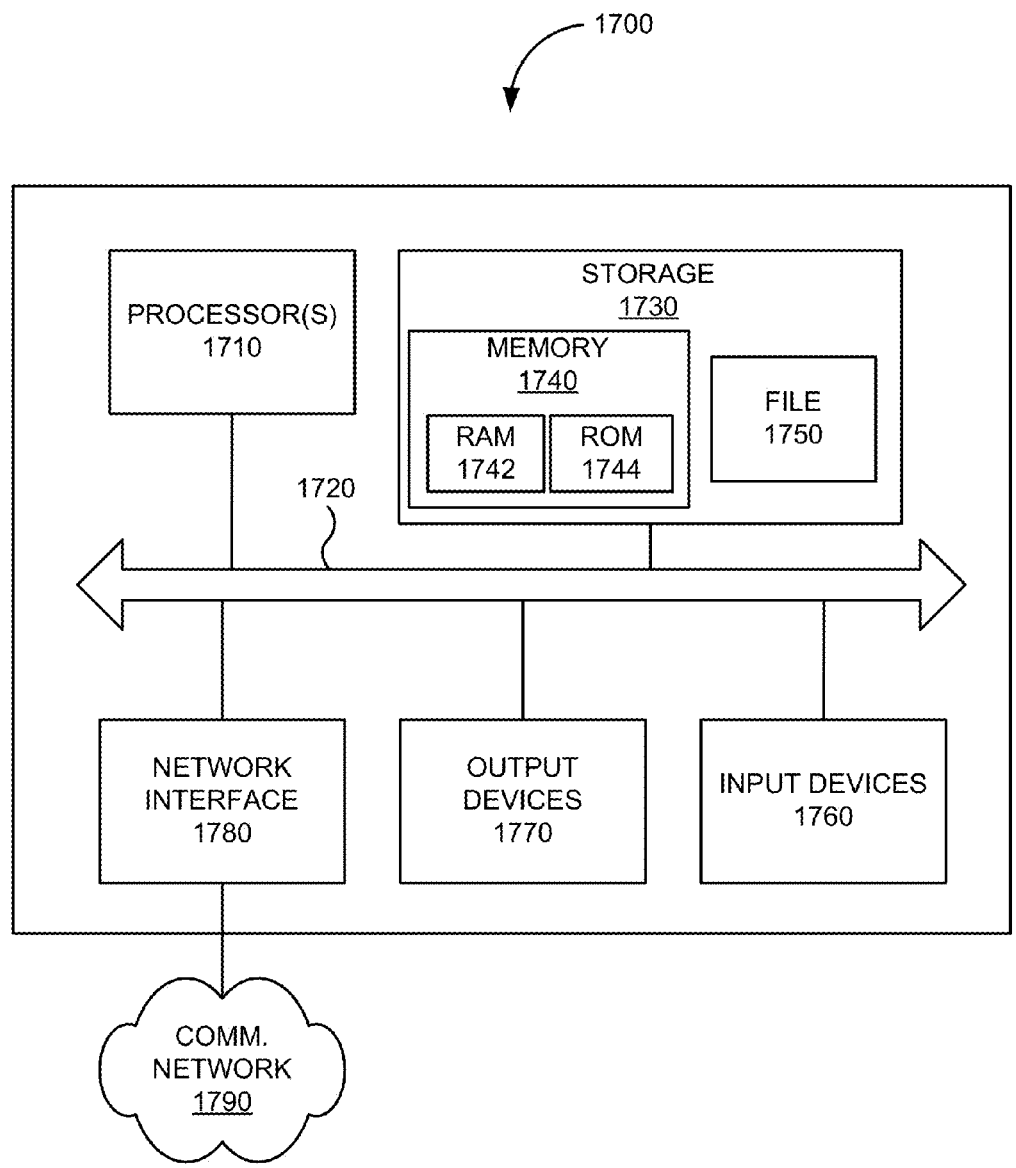
FIG. 17 is a block diagram of a computer system or information processing device that may incorporate an embodiment, be incorporated into an embodiment, or be used to practice any of the innovations, embodiments, and/or examples found within this disclosure.

FIG. 17 is a simplified block diagram of computer system 1700 that may be used to practice embodiments of the present invention. As shown in FIG. 17, computer system 1700 includes processor 1710 that communicates with a number of peripheral devices via bus subsystem 1720. These peripheral devices may include storage subsystem 1730, comprising memory subsystem 1740 and file storage subsystem 1750, input devices 1760, output devices 1770, and network interface subsystem 1780.

Bus subsystem 1720 provides a mechanism for letting the various components and subsystems of computer system 1700 communicate with each other as intended. Although bus subsystem 1720 is shown schematically as a single bus, alternative embodiments of the bus subsystem may utilize multiple busses.

Storage subsystem 1730 may be configured to store the basic programming and data constructs that provide the functionality of the present invention. Software (code modules or instructions) that provides the functionality of the present invention may be stored in storage subsystem 1730. These software modules or instructions may be executed by processor(s) 1710. Storage subsystem 1730 may also provide a repository for storing data used in accordance with the present invention. Storage subsystem 1730 may comprise memory subsystem 1740 and file/disk storage subsystem 1750.

Memory subsystem 1740 may include a number of memories including a main random access memory (RAM) 1742 for storage of instructions and data during program execution and a read only memory (ROM) 1744 in which fixed instructions are stored. File storage subsystem 1750 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Input devices 1760 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 1700.

Output devices 1770 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1700.

Network interface subsystem 1780 provides an interface to other computer systems, devices, and networks, such as communications network 1790. Network interface subsystem 1780 serves as an interface for receiving data from and transmitting data to other systems from computer system 1700. Some examples of communications network 1790 are private networks, public networks, leased lines, the Internet, Ethernet networks, token ring networks, fiber optic networks, and the like.

Computer system 1700 can be of various types including a personal computer, a portable computer, a workstation, a network computer, a mainframe, a kiosk, or any other data processing system. Due to the ever-changing nature of computers and networks, the description of computer system 1700 depicted in FIG. 17 is intended only as a specific example for purposes of illustrating the preferred embodiment of the computer system. Many other configurations having more or fewer components than the system depicted in FIG. 17 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for deploying web-based applications, the method comprising:
   receiving, at one or more computer systems, a declarative specification of a web-based application in accordance with a modular, end-to-end web development framework, the specification defining a view module for a client, a page associated with the view module of the client, and a model module for the client, wherein the web-based application is an HTML5 web-based application, and
   wherein the end-to-end web development framework comprises a compiler, a container, one or more core modules, one or more view modules that provide user interface components, and one or more server modules that support services of the one or more view modules in order to provide client code and server code in the single deployable archive in accordance with the declarative specification of the HTML5 web-based application;
   generating, with one or more processors associated with the one or more computer systems, files needed for the execution of the HTML5 web-based application by the client and a server in a single deployable archive in accordance with the declarative specification, wherein the end-to-end web development framework includes client-side application code and server-side application code in the single deployable archive,
   wherein data bindings for the view module for the client are automatically generated; and
   deploying, with the one or more processors associated with the one or more computer systems, the web-based application.

2. A system for deploying web-based applications, the system comprising:
   a processor; and
   a memory configured to store a set of instructions which when executed by the processor configure the processor to:
      receive a declarative specification of a web-based application in accordance with a modular, end-to-end web development framework, the specification defining a view module for a client, a page associated with the view module of the client, and a model module for the client, wherein the web-based application is an HTML5 web-based application, and
      wherein the end-to-end web development framework comprises a compiler, a container, one or more core modules, one or more view modules that provide user interface components, and one or more server modules that support services of the one or more view modules in order to provide client code and server code in the single deployable archive in accordance with the declarative specification of the HTML5 web-based application;
      generate files needed for the execution of the HTML5 web-based application by the client and a server in a single deployable archive in accordance with the declarative specification, wherein the end-to-end web development framework includes client-side application code and server-side application code in the single deployable archive,
      wherein data bindings for the view module are automatically generated; and
      deploy the web-based application.

3. A method for application lifecycle management, the method comprising:
   deploying an application archive to a server, the archive including an application specification defining an application in accordance with a modular, end-to-end web development framework and a set of supporting files referenced in the application specification, wherein the web-based application is an HTML5 web-based application, and
   wherein the end-to-end web development framework comprises a compiler, a container, one or more core modules, one or more view modules that provide user interface components, and one or more server modules that support services of the one or more view modules in order to provide client code and server code in the single deployable archive in accordance with the declarative specification of the HTML5 web-based application;
   compiling and generating files needed for the execution of the application by a client and the server in the archive in accordance with the application specification, wherein the archive is a single deployable archive, wherein the end-to-end web development framework includes client-side application code and server-side application code in the single deployable archive, and wherein data bindings are automatically generated;
   receiving a request to access the HTML5 web-based application;
   deploying user interfaces portions of the application to a client; and
   managing service requests to a server from the client, wherein the server executes services portions of the web-based application and the client executes view portions of the web-based application.

4. The method of claim 3 wherein the compiling and generating step is adapted to be controlled by a debugging mode.

5. The method of claim 3 wherein the compiling and generating step further includes optimizing the files needed for execution of the application by a client or a server by customizing one or more libraries used by the application.

6. The method of claim 3 wherein the compiling and generating step further includes optimizing the files needed for execution of the application by a client or a server by including only a portion of one or more libraries used by the application.

7. The method of claim 3 wherein the compiling and generating step further includes optimizing the files needed for execution of the application by a client or a server by generating an initial resource bundle configured to facilitate localization of the application; and
   wherein variations of the initial resource bundle are automatically detected and deployed.

8. The method of claim 3 wherein the application specification is an XML file including elements having HTML data elements or JavaScript data elements.

9. The method of claim 8 further comprising performing early error detection of the HTML data elements or the JavaScript data elements.

10. The method of claim 3 wherein the compiling and generating step further includes optimizing the files needed for execution of the application by a client or a server by optimizing or compiling a portable representation of application logic.

11. The method of claim 10 wherein the portable representation of application logic includes JavaScript.

12. The method of claim 10 wherein Java byte code is compiled from the portable representation of application logic.

13. The method of claim 10 wherein a portion of optimized or compiled application logic is adapted for a client scripting engine and a portion of the optimized or complied application logic is adapted for an virtual machine of a server or native execution on the server.

14. The method of claim 3 further comprising automatically deploying one or more libraries needed by the application to a server for use by a client based on the application specification.

15. The method of claim 3 wherein the compiling and generating step further includes optimizing the files needed for execution of the application by a client or a server by processing one or more templates.

16. The method of claim 3 wherein the compiling and generating step further includes optimizing the files needed for execution of the application by a client or a server for handling a plurality of namespaces for JavaScript files.

17. The method of claim 3 wherein the compiling and generating step further includes optimizing the files needed for execution of the application by a client or a server by processing a portion of the application specification that reconfigures or adds additional functionality to a complier of the application.

18. The method according to claim 1, wherein the view module is according to an Avatar framework.

19. The method according to claim 1, wherein the server and the client communicate according to one of a REST interface, a Server Sent Events (SSE) interface, and a Web Socket interface.

20. The method according to claim 1, wherein the data binding for the view module of the client comprises automatic data binding of a view model and a corresponding view component.

21. The method according to claim 1, wherein the page associated with the view module for the client is identified according to a page identifier (ID).

22. The method according to claim 1, wherein the modular, end-to-end web development framework uses JavaScript, HTML5, and a thin-server architecture.

23. The method according to claim 1, wherein during one of compile time and deploy time, the end-to-end web development framework generates static content based on the client code, and wherein the static content is changed in response to one of redeployment or recompilation of the application.

* * * * *

UNITED STATES PATENT AND TRADEMARK OFFICE
CERTIFICATE OF CORRECTION

| | |
|---|---|
| PATENT NO. | : 9,992,268 B2 |
| APPLICATION NO. | : 14/039514 |
| DATED | : June 5, 2018 |
| INVENTOR(S) | : Atsatt et al. |

Page 1 of 1

It is certified that error appears in the above-identified patent and that said Letters Patent is hereby corrected as shown below:

In the Specification

Column 3, Line 48, after "invention" insert -- . --.

Column 7, Line 51, delete "XML," and insert -- XML --, therefor.

Column 12, Line 37, delete "URL." and insert -- URL, --, therefor.

Column 13, Line 9, delete "$on Open" and insert -- $onOpen --, therefor.

Signed and Sealed this
Twenty-ninth Day of January, 2019

Andrei Iancu
*Director of the United States Patent and Trademark Office*